United States Patent [19]

Klabunde et al.

[11] Patent Number: 4,865,830
[45] Date of Patent: Sep. 12, 1989

[54] GAS PHASE PREPARATION OF ALUMINUM NITRIDE

[75] Inventors: Ulrich Klabunde, West Chester; Edward J. Newitt, Chadds Ford, both of Pa.; Frederick N. Tebbe, Hockessin, Del.

[73] Assignee: E. I. Du Pont de Nemours and Company, Wilmington, Del.

[21] Appl. No.: 149,157

[22] Filed: Jan. 27, 1988

[51] Int. Cl.$^4$ ........................ C04B 35/58; C01B 21/06
[52] U.S. Cl. ................................. 423/412; 423/290; 501/96; 556/176; 564/9
[58] Field of Search .................. 423/412, 290; 501/96; 556/176; 564/9

[56] References Cited

U.S. PATENT DOCUMENTS 4,519,966  5/1985  Aldinger et al. ..................... 501/96
4,746,501  5/1988  Maya ................................... 423/412
4,764,489  8/1988  Bolt ..................................... 423/412
4,783,430  11/1988 Su ....................................... 501/96

FOREIGN PATENT DOCUMENTS 0087798   9/1983  European Pat. Off. ........... 423/412
61-6104   1/1986  Japan ................................. 423/412
61-183108 8/1986  Japan ................................. 423/412

Primary Examiner—John Doll
Assistant Examiner—Wayne A. Langel
Attorney, Agent, or Firm—James A. Costello

[57] ABSTRACT

Admixing an aluminum alkyl, and optionally a boron compound, with a hydride of nitrogen in the gas phase and maintaining a gas phase temperature, optionally in the presence of a carrier gas, and producing aluminum nitride alone or in admixture with a precursor thereof or boron nitride or both.

11 Claims, No Drawings

GAS PHASE PREPARATION OF ALUMINUM NITRIDE

BACKGROUND OF THE INVENTION

Certain of the known processes for preparing aluminum nitride involve heating aluminum metal or an aluminum compound in a non-oxidizing nitrogeneous atmosphere such as nitrogen, hydrazine and ammonia to form the nitride. Reaction of trialkylaluminum and ammonia or other nitrogen hydride to form aluminum nitride is known from U.S. Pat. No. 3,922,475 which discloses preparation of films of nitrides of Group III elements, including Al, by mixing volatile alkyl derivatives of said elements with ammonia or selected alkyl amines, as gases, and pyrolyzing the mixed gases or the solid reaction product, optionally using a carrier gas such as helium. The intermediate reaction product, formulated for ammonia as $R_3M.NH_3$ where M is a Group III element and R is alkyl, is sometimes gaseous. The final products are films deposited on insulating or semiconducting substrates.

Japanese Application No. 78-68700 discloses reacting a hexane solution of triethylaluminum with ammonia, heating to evaporate solvent, then heating under vacuum at 1000° to obtain black aluminum nitride. Myakininkov et al., Inorganic Materials (USSR), 10 (10), 1635 (1974) disclose deposition of aluminum nitride films onto silicon semiconducting substrates by gaseous reaction of $Al(C_2H_5)_3$ and hydrazine with helium as a carrier gas at a temperature in the range 750° to 1000°.

Bahr, FIAT, Rev. Ger. Sci., Inorg. Chem. II, 155 (1948) discloses the reaction of trimethylaluminum and ammonia to form a 1:1 adduct which, on heating at gradually higher temperatures, forms dimethylaluminum amide, then polymeric aluminum amides and finally aluminum nitride. Japanese Application No. 54-013,439 discloses the reaction of purified trialkylaluminum with ammonia or a primary or secondary amine in hydrocarbon solution to form an aluminum nitride precursor containing at least one Al-N bond. The precursor is converted to aluminum nitride powder by heating it above 400° C. in the presence of an inert gas, vacuum or ammonia gas.

At a meeting of the Materials Research Society, April 1986, Palo Alto, Calif., Interrante disclosed the stepwise reaction of trialkylaluminum compounds $R_3Al$, where R is $C_{1-4}$ alkyl, with ammonia to form aluminum nitride. Trimethylaluminum was reacted with ammonia at low temperatures of about −78° C. in a hydrocarbon solvent, to form a 1:1 adduct. The adduct lost methane on heating at or above 70° C. to give dimethylaluminum amide. Heating at 160° to 200° C. lead to further loss of methane to give $CH_3AlNH$. Final conversion of $RAlNH$ to AlN powder was achieved by heating at 1000° C.

U.S. Pat. No. 3,352,637 discloses formation of nitrides of Al, B, Si, or Zr by contacting a gaseous chloride of said element with gaseous ammonia in the presence of a heat transfer gas which is $H_2$, $N_2$, or Ar, and which has been pre-heated to at least 2500° C., under conditions such that the reactor wall temperature is below 500° C., preferably about 200° C.

Japanese Application No.8722952 discloses preparation of fine, high purity aluminum nitride powder suitable for manufacturing semi-transparent sintered objects, said powder having an average particle diameter not exceeding $2\mu$, prepared by reacting alumina with ammonia or $N_2$ in the presence of carbon.

Japanese Application No. 62-100,405 discloses aluminum nitride powder having particle sizes less than $3\mu$ prepared from selected alumina and carbon by firing an aqueous gel thereof in $N_2$ at 1350° to 1650° C.

SUMMARY OF THE INVENTION

The present invention provides an all-gas phase, one-step method for preparing particulate aluminum nitride or a mixture thereof with particulate boron nitride. The nitrides are characterized by a relatively uniform, narrow particle size distribution, and are well-suited to the preparation of shaped ceramic articles. The method comprises (i) admixing an aluminum alkyl and optionally a volatile compound of boron with nitrogen and/or a hydride of nitrogen in the gas phase, (ii) maintaining a gas phase temperature, and (iii) producing particles of aluminum nitride, an aluminum nitride precursor, or mixtures of one or both of them with boron nitride or a precursor for boron nitride.

The process employs as one reactant an aluminum alkyl, $R_{3-x}H_xAl$, where R is $C_1$ to $_6$ alkyl, preferably methyl or ethyl, most preferably ethyl, and x is 0 or 1. Another reactant is a compound comprising nitrogen, or nitrogen and hydrogen, preferably ammonia or hydrazine, most preferably ammonia. An optional reactant is a compound of boron that is volatile under process conditions. Suitable boron compounds include borazine, boranes of up to about 6 boron atoms (borane, diborane, triborane, etc.), alkylated boranes, aminoboranes, and adducts of the boranes with ammonia or amine(s). It is preferred that the boron compound contain little or no carbon. Borazine and diborane are preferred. Small amounts of other additives may also be employed, including sintering aids such as the volatile compounds of calcium and yttrium.

Hereafter, the term "precursor" will be understood to comprise one or more compounds containing the elements hydrogen, carbon, aluminum, nitrogen and, optionally, boron, all of said precursor being completely converted to aluminum nitride, or, if boron is present, a mixture of aluminum and boron nitrides, by continuing the process to completion. Precursors include amides, imides, and complexes thereof with aluminum alkyls and may be polymeric or monomeric in form. By "gas phase temperature" is meant a temperature sufficiently high, at least 100° C., to substantially prevent condensation of reactants and early reaction products.

Vapors of the aluminum, boron (if present) and nitrogen compounds, which may be entrained in a carrier gas such as nitrogen, argon, helium, hydrogen, methane or ethane, are introduced, preferably pre-mixed, into a reactor heated to a gas phase temperature and reacted until a normally white, particulate product is formed. This product, which comprises precursor admixed with aluminum nitride or a mixture of aluminum and boron nitrides, can be fully converted to aluminum nitride or a mixture of aluminum and boron nitrides, by further heating at a higher temperature, or it can be molded first into a shaped article, and then converted to the nitride(s) by further heating. The extent of conversion to nitride can be determined by X-ray diffraction.

The carrier gas employed, if any, should normally be inert under reaction conditions; exceptions are nitrogen and hydrogen which may be beneficially reactive.

The molar ratio of the aluminum alkyl to the nitrogen compound can be in the range of about 0.001:1 to 1:1, preferably about 0.1:1; provided that when nitrogen is used as a carrier/reactive gas, the ratio will be about 1:1 to 100:1. If a boron compound is employed, it is used in an amount to yield a final ceramic composition containing about 0.2 to 20 g atoms of aluminum per g atom of boron, preferably from 0.5 to 10 g atoms of aluminum per g atom of boron. Carrier gases are employed at a concentration from 0 to about 99 volume percent of the total gas (carrier+reactants).

DETAILS OF THE INVENTION

The minimum temperature at which the vapors can be introduced to the reactor will depend on the boiling point of the aluminum alkyl selected and, as already indicated, must be high enough to prevent any substantial degree of condensation of reactants or any early-formed intermediate product, such as an adduct of the aluminum alkyl and the nitrogen compound. In general, the preferred minimum temperature is about 300° C. The reactor can be heated to successively higher temperatures after introduction of the reactants, or the reactor can contain multiple reaction zones maintained at different temperatures. Temperatures of at least about 750° C. are desirable for conversion to nitride at practical rates, while temperatures as high as about 2500° C. are contemplated for rapid conversion. Incompletely converted particulate products comprising precursor admixed with aluminum nitride or aluminum boron nitrides can be prepared throughout this temperature range. As will be appreciated by one skilled in the art, temperatures lower than 750° C. can be employed depending on the degree of conversion that is desired and the time available to effect said conversion. Likewise, temperatures above 2500° C. can be employed to effect quicker conversion. Residence times in the reactor can vary widely from about $10^{-4}$ to $10^4$ seconds, preferably about $10^{-3}$ to $10^3$ seconds.

The first-formed product of the process, typically comprises aluminum nitride admixed with boron nitride, if a boron nitride-producing reactant was employed, as well as precursors for one or both of the aluminum and boron nitrides. The product will be in the form of individual particles and agglomerates of several to several hundred particles. Particle size will depend on the reaction time, temperature and reactant concentrations; higher concentrations and/or longer reaction times will, in general, promote larger particle sizes. Individual particles, which can be substantially crystalline at higher conversions, are generally in the size range of about 0.005 $\mu$m to 1 $\mu$m, although some relatively small portion may be outside this range.

Aluminum nitride and boron nitride are high temperature (refractory) ceramic materials, the former possessing unique thermal conductivity. A mixture of these nitrides, when formed into a dense "mixed" ceramic, is known to possess useful properties for structural applications such as low dielectric constant, thermal shock resistance and improved mechanical toughness, spall resistance, erosion and ablation resistance (U.S. Pat. No. 4,666,873). The mixed AlN/BN ceramic has a low coefficient of thermal expansion and is machinable (U.S. Pat. No. 4,642,298). High thermal conductivity and low dielectric constants possessed by the mixed ceramics are desirable characteristics in electronic applications. These properties can be tailored to meet specific requirements by varying the ratio of Al and B in the mixed ceramic.

It will be recognized by the skilled artisan that many of the ceramic properties of aluminum nitride and mixtures thereof with boron nitride depend critically on the purity of these materials. The present all gas-phase process, when practiced with purified reactants, provides a product that is relatively free of contaminants. Reactant purification, which is desirable though not essential, is especially convenient because of the volatility of the reactants employed. Nitrogen compounds, aluminum alkyls and volatile boron compounds for use in the present process, as well as carrier gases, are available in purified form from commercial suppliers. Avoidance of oxygen and oxygenated compounds is especially desirable in the practice of this invention.

The reaction can be carried out in batch, semi-continuous or continuous equipment; continuous flow operation is preferred. The particulate product can be collected by methods which will be known to those skilled in the art, such as by filtration through a fine filter, collection on cooled surfaces, or by electrostatic precipitation.

EXAMPLE 1

A flow apparatus was used consisting of a quartz tube (6 mm internal diameter) containing heated vapor inlets for the two reactants plus carrier gas, a gas mixing zone, a first reaction zone heated to about 300° C., in series with a second reaction zone heated to about 600° C. Each reaction zone was 3.8 cm in length. Powdered product exiting from the second reaction zone was collected in an unheated final portion of the tube.

Triethylaluminum liquid was pumped to the heated inlet zone and vaporized at approximately 180° C. to 200° C. to give 8 cc/min of vapor, then mixed with ultra pure nitrogen, 74 cc/min. A second gas stream, 329 cc/min, containing 10 volume percent of high purity electronics grade ammonia in ultra high purity nitrogen, was supplied through a separate inlet. The two streams were combined in the gas mixing zone at about 200° C. The combined streams (total flow rate, 411 cc/min) were admitted to the reaction zones and finally to a cooled downstream zone. No deposition or condensation was observed in any of the heated zones.

Powder deposited on the walls of the cool zone was collected and analyzed by electron microscopy. It consisted of individual particles and loose associations of particles. The individual particles had an average size of 0.04 to 0.07 $\mu$m. The associations of particles were porous and sometimes elongated, appearing fiber-like at low magnifications. A sample of the powdered product, heated under electronics grade ammonia at 900° to 950° C. for 30 min and then examined by X-ray diffraction, was found to be aluminum nitride comprising individual crystals having an average size of about 0.02 to 0.04 $\mu$m.

EXAMPLE 2

The procedure of Example 1 when practiced with any of the following modifications will produce particulate admixtures of intimately related nitrides of aluminum and boron. To the heated inlet zone of the described flow apparatus is pumped a volatile boron compound selected from borazine, boranes of up to about 6 boron atoms (borane, diborane, triborane, etc.), alkylated boranes, aminoboranes, and adducts of the boranes with ammonia or amine(s), in addition to the triethylaluminum described in Example 1. The relative concentrations of volatile aluminum- and boron-containing reactants are selected to produce a particulate product having a ratio of 0.2 to 20 g atoms of aluminum per g atom of boron.

The embodiments of the invention in which an exclusive property or privilege is claimed are defined as follows:

1. A method for preparing particulate aluminum nitride, an aluminum nitride precursor, or mixtures of one or both of them with boron nitride or a precursor for boron nitride comprising the steps:
   (i) admixing an aluminum alkyl and optionally, a volatile compound of boron with nitrogen or a hydride of nitrogen, or both, in the gas phase,
   (ii) maintaining a gas phase temperature, and
   (iii) producing particles of aluminum nitride, an aluminum nitride precursor, or mixtures of one or both of them with boron nitride or a precursor for boron nitride;
   the aluminum alkyl having the formula $R_{3-x}H_xAl$ wherein R is $C_{1\ to\ 6}$ alkyl and x is 0 or 1.

2. A method according to claim 1 wherein the alkyl is trimethyl- or triethyl-aluminum and is mixed with a hydride of nitrogen selected from ammonia and hydrazine.

3. A method according to claim 2 wherein the molar ratio of aluminum alkyl to hydride is about 0.001:1 to 1:1.

4. A method according to claim 3 wherein the gas phase temperature is at least 300° C.

5. A method according to claim 1 employing a carrier gas to entrain the gas phase admixture formed in step (i).

6. A method according to claim 2 employing a carrier gas to entrain the gas phase admixture formed in step (i).

7. A method according to claim 3 employing a carrier gas to entrain the gas phase admixture formed in step (i).

8. A method according to claim 4 employing a carrier gas to entrain the gas phase admixture formed in step (i).

9. A method according to claim 1 wherein the product of step (iii) comprises aluminum nitride and boron nitride in the ratio of 0.2 to 20 g atoms of aluminum per g atom of boron.

10. A method according to claim 1 employing a compound of boron selected from the group borazine, boranes of up to about 6 boron atoms, alkylated boranes, aminoboranes, and adducts of the boranes with ammonia or amine.

11. A method according to claim 10 wherein the boron compound is borazine or diborane.

* * * * *